UNITED STATES PATENT OFFICE.

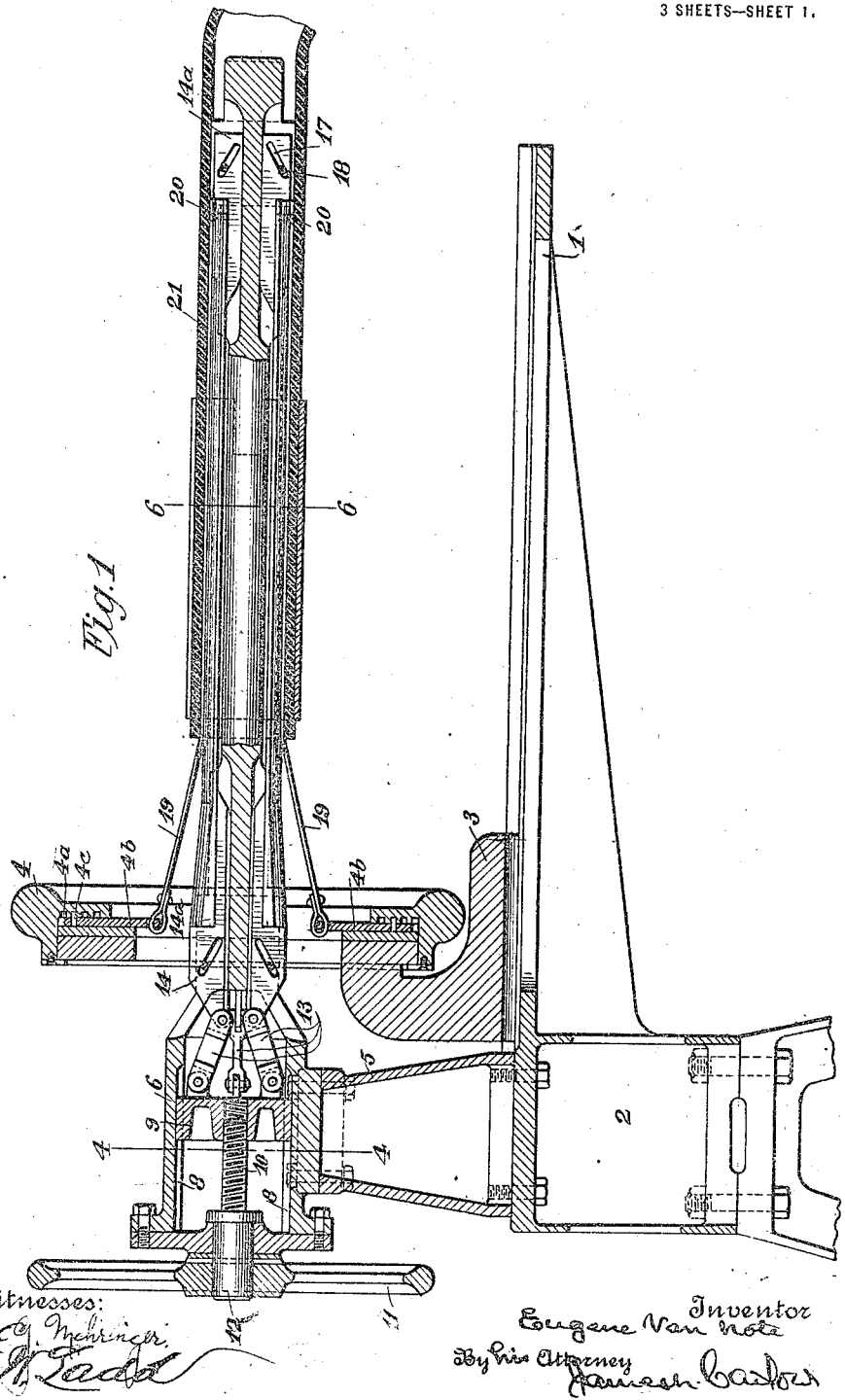

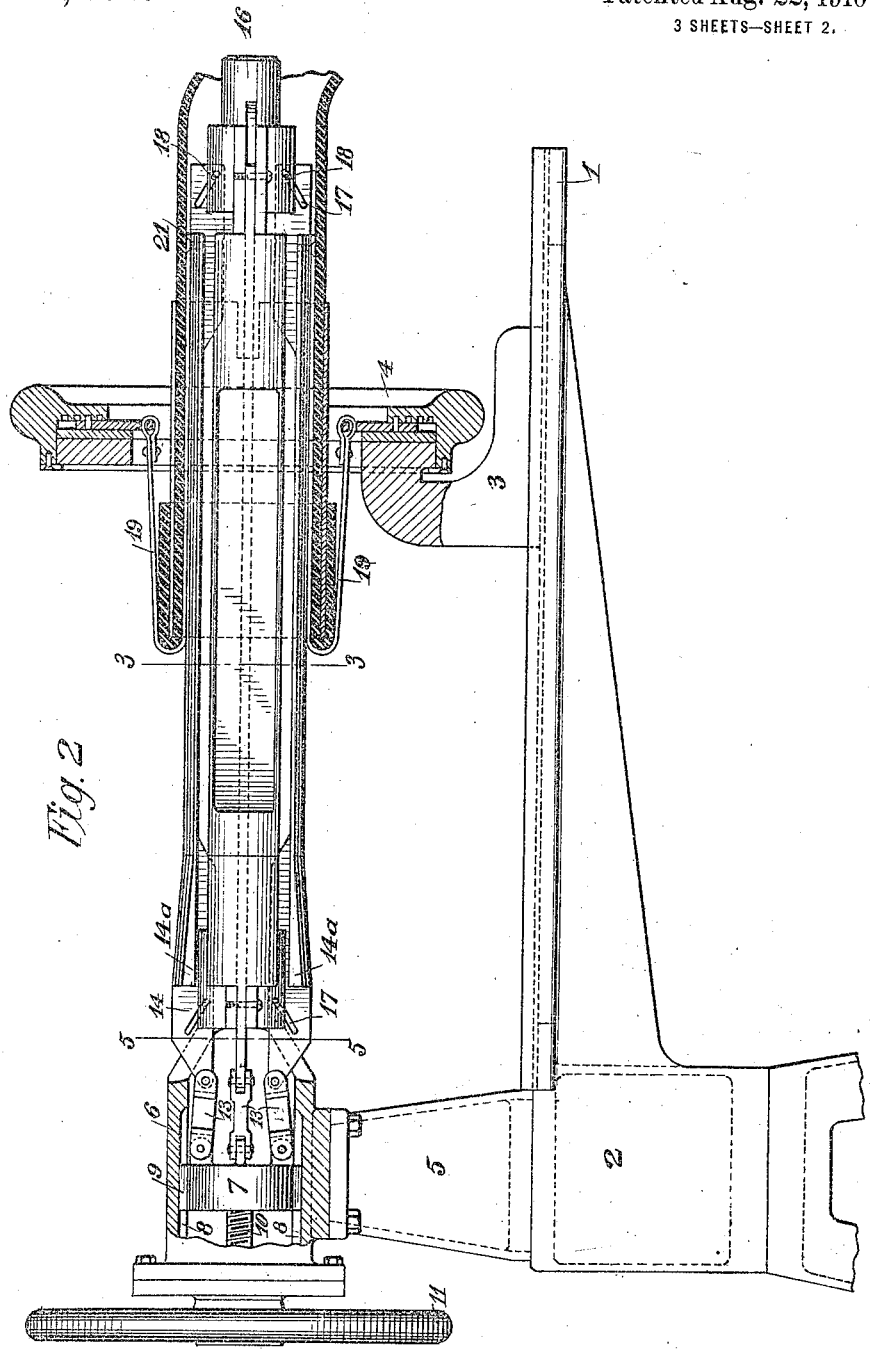

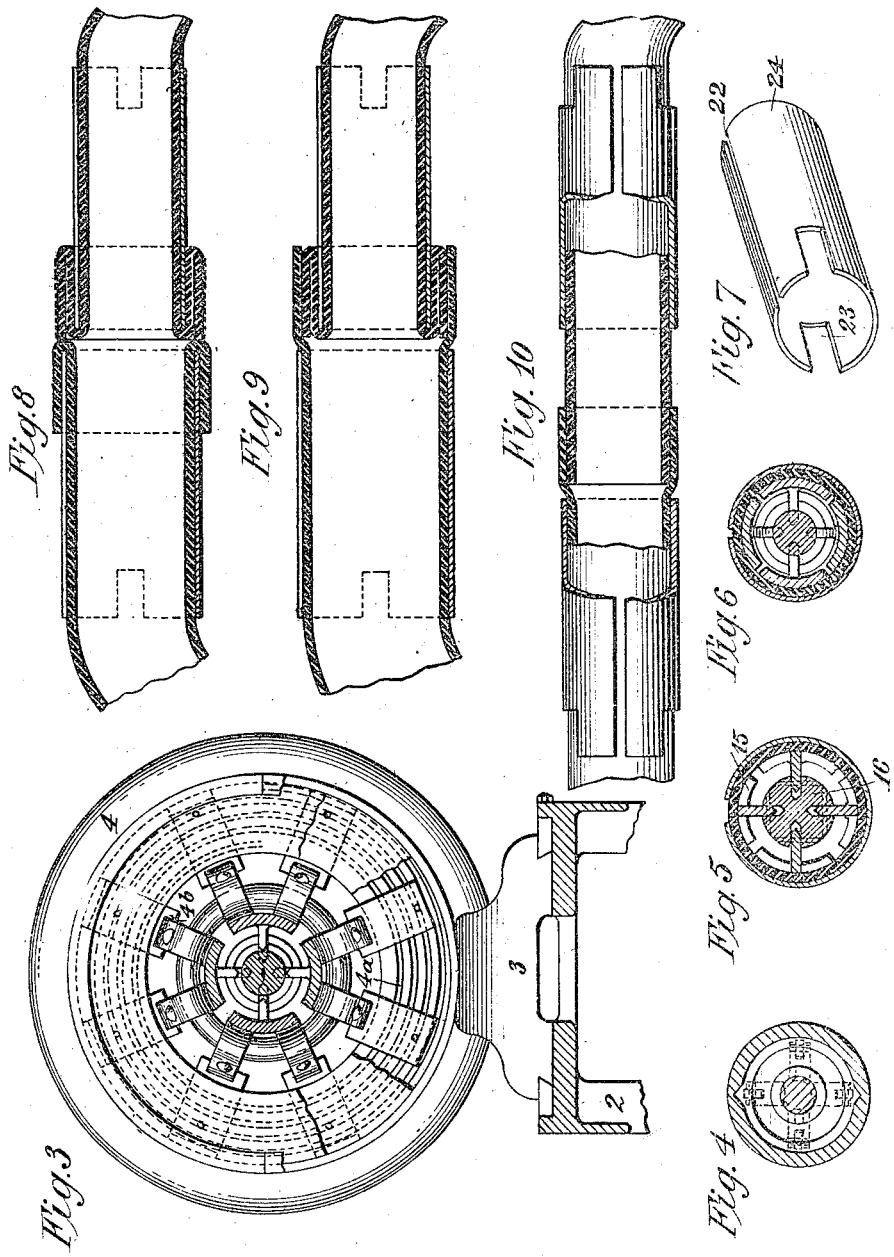

EUGENE VAN NOTE, OF NEW YORK, N. Y.

MACHINE FOR PREPARING TUBES FOR SPLICING.

1,195,422.

Specification of Letters Patent. Patented Aug. 22, 1916.

Application filed December 3, 1914. Serial No. 875,223.

*To all whom it may concern:*

Be it known that I, EUGENE VAN NOTE, a citizen of the United States, and a resident of the borough of Manhattan, city, county, and State of New York, have invented a new and useful Improvement in Machines for Preparing Tubes for Splicing, of which the following is a specification, reference being had to the accompanying drawings, which form a part of the same.

The object of my invention is to treat the opposite ends of tubular flexible bodies so that they may be conveniently secured together. In the case of inner tubes for automobile tires my device is used after the tube itself is manufactured but before the ends of the tube are connected together. My device is adapted to turn back the ends of the tube upon the same, after which one of the ends of the tube is again returned upon itself. When the tube is in this condition, namely, one end lapped upon itself forming one fold and the other end lapped upon itself and returned forming two folds, the exposed laps may be treated with cement or other securing material and the single lap end is lapped over the exposed surface of the double lap end, and the two ends of the tube are then vulcanized or otherwise secured in any of the well-known ways. After the ends of the tubes are securely vulcanized or otherwise fastened to each other, the lap remaining in the tube is pulled out manually leaving the finished product consisting of a continuous annular tube.

Referring now to the drawings: Figure 1 is a vertical section of my device showing a tube in place ready to be lapped; Fig. 2 is a vertical section of my device showing a tube in the process of being lapped; Fig. 3 is a cross section on the line 3—3 of Fig. 2, showing the cross-head and a tube in the process of being lapped in the background. Fig. 4 is a cross section on the line 4—4 of Fig. 1; Fig. 5 is a cross section on the line 5—5 of Fig. 2; Fig. 6 is a cross section on the line 6—6 of Fig. 1; Fig. 7 is an illustration of my preferred form of mandrel; Fig. 8 shows the lapping of the ends of the tube preparatory to their being prepared for connection; Fig. 9 illustrates the tube after the ends thereof have been prepared for connection with the single lap of one end of the tube and the double lap of the other end of the tube in position; Fig. 10 illustrates the tube after the ends thereof have been secured in position and the remaining laps pulled out.

Referring now in detail to these drawings 1 represents a table supported by a suitable pedestal 2, on which table is adapted to slide a cross head support 3, which supports the cross-head 4; this cross-head is provided with a threaded portion 4ª which is adapted to adjust radially the band plates 4ᵇ through the coöperation of the lugs 4ᶜ connected to the band plates and extending into the grooves of the threaded portion 4ª. Mounted on the pedestal 2 is also a support 5, on which is mounted the casing 6. In this casing is mounted an adjustable slide 7 held against rotation in the tracks 8 by means of lugs 9, attached to the said slide. This slide 7 is manipulated by means of the screw 10 which is integrally connected to the adjusting handle 11, mounted on the pivot 12. Attached to the slide 7, at one end, are toggles 13, which are connected at the other end thereof to the vanes 14. These vanes are cut away intermediate their ends forming the recesses 14ᵃ therein. On the rear ends of the projecting portions of these vanes being the ends farther away from the adjusting handle 11, are T-heads 15, the function of which will be herein described. The vanes 14 are adjustably mounted in a supporting rod 16, being adapted to slide radially therein by means of the coöperation of the slots 17 in the vanes and pins 18 in the supporting rod 16. I have shown in the drawings four of these vanes, but of course any number of vanes may be used.

Connected with the band plates 4ᵇ are the forward ends of bands 19, being connected at 20 to the rear T-heads 15 of the vanes 14 as shown.

In Fig. 7 I have shown my preferred form of mandrel to be used in connection with my device. This mandrel is preferably made of one piece of tubular metal 24, having a passageway 22 longitudinally cut therethrough. I have also provided in this mandrel recesses 23 the function of which will be hereafter shown.

In order to operate my device a tube as for instance an inner tube used in connection with automobile tires, prior to the connection of its ends, is drawn over the rod 16 and the rear T-heads 15 of the vanes 14.

The said vanes during such operation being held in the contracted position with reference to the rod 16 so that the tube may be readily drawn thereon without unnecessary friction. After the tube has been so drawn on the rod and vanes, and is in the desired position the slotted mandrel 24 is drawn over the tube to a point near the end thereof desired to be lapped. The handle 11 is then manipulated so as to draw toward itself the slide 7, the connected toggles 13, and the vanes 14. In the travel of the said vanes the slots 17 therein coöperate with the pins 18 of the rod 16 and thus expand the vanes with reference to the supporting rod 16. It will be noted that the vanes 14 are cut away intermediate their length so as to effect engagement with the tube only at their rear ends. When the handle 11 has been sufficiently manipulated the vanes 14 will be expanded so as to engage the inner walls of the tube 21 and hold the same in rigid position. The handle of the cross-head 4 may then be revolved so as to effect the radial movement of the band plate 4ᵇ to adjust the same into the desired position. The tube is now in position to be turned or lapped. In order to accomplish this the cross-head 4 is manually drawn back and the flexible bands 19 turn the end of the tube over the mandrel 24, which slides back over the tube until the desired lap of the tube is accomplished. This is clearly shown in Fig. 2. When the desired lap has been effected the handle 11 is manipulated to release the vanes 14 and the mandrel and tube in its lapped condition are then withdrawn from the device. The other end of the tube is then treated in the same way so as to obtain the desired lap. In order that sufficient cementing or vulcanizing surface may be exposed for treatment it will be seen that the end of the tube which is to receive the double lap will be lapped over on the machine a distance about twice that of the single lap end. The lapped portion of this end is then lapped back again on itself the latter lapping being performed by hand after the tube has been removed from the machine. To facilitate the turning back by hand of the final lap of the double lapped end I have provided recesses 23 in the mandrel 24 so that the end of the tube may be readily taken between the thumb and finger thus enabling the operator to obtain a proper grip on the same. After both ends of the tube have been prepared in the manner indicated they are brought together as shown in Fig. 8, the double lapped end forming a male member and the single lapped end forming a female member. The exposed surfaces of the laps are then treated for vulcanization or other method of connection, and the female lap is then drawn over the exposed surface of the male lap as shown in Fig. 9. The ends of the tube are then vulcanized or otherwise connected and the lap remaining in the male member is then pulled out manually and the tube slipped out of the mandrels through the slot 22 of each mandrel.

Claims:

1. In a machine for preparing tubes for splicing, a substantially non-flexible mandrel comprising a cylinder having a longitudinal slot therein for the purpose of passing flexible tubes through said slot and into and out of said cylinder, and recesses in one end of said cylinder for the purpose of facilitating the handling of tubes thereon.

2. In a machine for preparing tubes for splicing, a tube supporting rod, vanes radially operating therein, flexible bands connected near one end of said rod or vanes, band plates, means for connecting said bands thereto, adjusting mechanism in a slidable cross-head to radially adjust said band plates, a slidable cross-head, toggle connections between said vanes and an adjustable slide, an adjustable slide, means for holding said slide against revolving action, a casing in which said slide is adapted to be reciprocated, and means for reciprocating said slide.

3. In a machine for preparing tubes for splicing, a stationary supporting rod having recesses, vanes slidably mounted in said recesses and longitudinally slidable means for actuating said vanes.

4. In a machine for preparing tubes for splicing, a stationary supporting rod having a recess, a vane slidably mounted in said recess, longitudinally slidable means for actuating said vane, and a flange portion extending laterally from the outer longitudinal end of said vane.

5. In a machine for preparing tubes for splicing, a supporting rod, a slidable cross-head mounted concentrically on said rod for movement axially of the latter, and a plurality of flexible bands connecting said slidable cross-head with said supporting rod, said slidable cross-head being adapted to act on said flexible bands to turn back material on said supporting rod.

6. In a machine for preparing tubes for splicing, a supporting rod, a slidable cross-head mounted concentrically on said rod for movement axially of the latter, radially movable band plates on said cross-head, and means for radially adjusting the said band plates on said cross-head, and flexible bands connecting with said band plates and supporting rod, said slidable cross-head being adapted to act on said flexible bands to turn back material on said supporting rod.

7. In a machine for preparing tubes for splicing, a supporting rod having recesses, a slide adjustable axially of said rod, vanes mounted in said recesses, and connected at one end with said slide, a fixed track, means on said slide adapted to engage said track to prevent rotation of the slide and means for reciprocating said slide.

8. In a machine for preparing tubes for splicing, a supporting rod, a slidable cross-head mounted concentrically on the rod for movement axially of the latter, vanes mounted for radial movement in said rod, longitudinally slidable means for actuating said vanes, and a plurality of flexible bands connecting said slidable cross-head with said vanes.

EUGENE VAN NOTE.

Witnesses:
JAMES N. CATLOW,
EVA G. MEHRINGER.